United States Patent
Du et al.

(10) Patent No.: US 9,937,485 B2
(45) Date of Patent: Apr. 10, 2018

(54) HYDROCRACKING CATALYST, PROCESS FOR PREPARING THE SAME AND USE THEREOF

(71) Applicants: CHINA PETROLEUM & CHEMICAL CORPORATION, Beijing (CN); FUSHUN RESEARCH INSTITUTE OF PETROLEUM AND PETROCHEMICALS, SINOPEC, Fushun, Liaoning (CN)

(72) Inventors: Yanze Du, Liaoning (CN); Minghua Guan, Liaoning (CN); Fenglai Wang, Liaoning (CN); Chang Liu, Liaoning (CN)

(73) Assignees: CHINA PETROLEUM & CHEMICAL CORPORATION, Beijing (CN); FUSHUN RESEARCH INSTITUTE OF PETROLEUM AND PETROCHEMICALS, SINOPEC, Fushun, Liaoning (CN)

( * ) Notice: Subject to any disclaimer, the term of this patent is extended or adjusted under 35 U.S.C. 154(b) by 0 days.

(21) Appl. No.: 15/335,586

(22) Filed: Oct. 27, 2016

(65) Prior Publication Data
US 2017/0043323 A1   Feb. 16, 2017

Related U.S. Application Data

(62) Division of application No. 13/177,364, filed on Jul. 6, 2011, now abandoned.

(30) Foreign Application Priority Data

Jul. 7, 2010  (CN) .......................... 2010 1 0222155

(51) Int. Cl.
*B01J 37/06* (2006.01)
*C10G 47/12* (2006.01)
*B01J 23/883* (2006.01)
*B01J 21/12* (2006.01)
*B01J 23/28* (2006.01)
*B01J 23/30* (2006.01)
*B01J 23/75* (2006.01)
*B01J 23/755* (2006.01)
*B01J 23/85* (2006.01)
*B01J 23/888* (2006.01)
*B01J 29/072* (2006.01)
(Continued)

(52) U.S. Cl.
CPC .............. *B01J 23/883* (2013.01); *B01J 21/12* (2013.01); *B01J 23/28* (2013.01); *B01J 23/30* (2013.01); *B01J 23/75* (2013.01); *B01J 23/755* (2013.01); *B01J 23/85* (2013.01); *B01J 23/888* (2013.01); *B01J 23/8885* (2013.01); *B01J 29/072* (2013.01); *B01J 29/076* (2013.01); *B01J 35/002* (2013.01); *B01J 35/0093* (2013.01); *B01J 35/1019* (2013.01); *B01J 35/1023* (2013.01); *B01J 35/1038* (2013.01); *B01J 35/1042* (2013.01); *B01J 35/1047* (2013.01); *B01J 35/1061* (2013.01); *B01J 37/009* (2013.01); *B01J 37/0009* (2013.01); *B01J 37/0018* (2013.01); *B01J 37/0201* (2013.01); *B01J 37/0213* (2013.01); *B01J 37/0236* (2013.01); *B01J 37/036* (2013.01); *B01J 37/04* (2013.01); *B01J 37/08* (2013.01); *C10G 47/12* (2013.01); *C10G 47/20* (2013.01); *C10G 65/12* (2013.01); *B01J 29/044* (2013.01); *B01J 29/045* (2013.01); *B01J 29/146* (2013.01); *B01J 29/166* (2013.01); *B01J 29/46* (2013.01); *B01J 29/48* (2013.01); *B01J 29/7615* (2013.01); *B01J 29/7815* (2013.01); *B01J 29/85* (2013.01); *B01J 2229/16* (2013.01); *B01J 2229/36* (2013.01); *B01J 2229/37* (2013.01); *C10G 2300/1074* (2013.01); *C10G 2300/301* (2013.01); *C10G 2300/4018* (2013.01)

(58) Field of Classification Search
CPC ............... B01J 37/0063; B01J 37/0213; B01J 37/0236; B01J 37/06; C10G 47/12; C10G 2300/1074
See application file for complete search history.

(56) References Cited

U.S. PATENT DOCUMENTS

| 4,820,677 | A | 4/1989 | Jacobson et al. |
| 5,086,032 | A | 2/1992 | Mazzocchia et al. |
| 5,565,088 | A | 10/1996 | Nair et al. |
| 6,399,530 | B1 * | 6/2002 | Chen ....................... B01J 21/12 |
|  |  |  | 502/254 |
| 6,527,945 | B2 | 3/2003 | Benazzi et al. |
| 2002/0010086 | A1 * | 1/2002 | Plantenga ............ B01J 31/0209 |
|  |  |  | 502/167 |

FOREIGN PATENT DOCUMENTS

| CN | 1302850 A | 7/2001 |
| CN | 1331276 A | 1/2002 |

(Continued)

OTHER PUBLICATIONS

European Search Report from the European Patent Office in corresponding European Application No. 111728214, dated Oct. 26, 2011.

(Continued)

*Primary Examiner* — Randy Boyer
(74) *Attorney, Agent, or Firm* — Novick, Kim & Lee, PLLC; Allen Xue

(57) ABSTRACT

The present invention relates to a hydrocracking catalyst, a process for preparing the same and use thereof. The present catalyst comprises a cracking component and a hydrogenation component, wherein the cracking component comprises from 0 to 20 wt. % of a molecular sieve and from 20 wt. % to 60 wt. % of an amorphous silica-alumina, the hydrogenation component comprises at least one hydrogenation metal in a total amount of from 34 wt. % to 75 wt. % calculated by the mass of oxides, each amount is based on the total weight of the catalyst. The present catalyst is prepared by directly mixing an acidic component powder material with an impregnating solution, impregnating, filtering, drying, molding, and drying and calcining.

19 Claims, No Drawings

| (51) | Int. Cl. | |
|---|---|---|
| | B01J 29/076 | (2006.01) |
| | B01J 35/00 | (2006.01) |
| | B01J 35/10 | (2006.01) |
| | B01J 37/00 | (2006.01) |
| | B01J 37/02 | (2006.01) |
| | B01J 37/03 | (2006.01) |
| | B01J 37/04 | (2006.01) |
| | C10G 47/20 | (2006.01) |
| | C10G 65/12 | (2006.01) |
| | B01J 37/08 | (2006.01) |
| | B01J 29/04 | (2006.01) |
| | B01J 29/14 | (2006.01) |
| | B01J 29/16 | (2006.01) |
| | B01J 29/46 | (2006.01) |
| | B01J 29/48 | (2006.01) |
| | B01J 29/76 | (2006.01) |
| | B01J 29/78 | (2006.01) |
| | B01J 29/85 | (2006.01) |

(56) References Cited

FOREIGN PATENT DOCUMENTS

| CN | 1400287 A | 3/2003 |
| CN | 1768951 A | 5/2006 |
| CN | 1951554 A | 4/2007 |
| CN | 101402048 A | 4/2009 |
| CN | 101269343 B | 4/2010 |
| CN | 101491774 B | 5/2011 |
| JP | 7-96195 A | 11/1995 |

OTHER PUBLICATIONS

Hernandez et al., "High performance sorbents for diesel oil desulfurization," Chemical Engineering Science, vol. 65, pp. 603-609 (2010).

* cited by examiner

HYDROCRACKING CATALYST, PROCESS FOR PREPARING THE SAME AND USE THEREOF

CROSS-REFERENCE TO RELATED APPLICATIONS

This application is a divisional application of U.S. application Ser. No. 13/177,364 filed on Jul. 6, 2011, which claims priority under 35 USC § 119 to Chinese Patent Application No. 201010222155.1 filed on Jul. 7, 2010, the contents of which are incorporated herein by reference in their entirety.

FIELD OF THE INVENTION

The present invention relates to a hydrocracking catalyst, in particular a single-stage hydrocracking catalyst having a high metal amount, being used for processing heavy distillate oil and having a high selectivity to middle distillates, a process for preparing the same, and use thereof.

BACKGROUND OF THE INVENTION

Hydrocracking technology as one of the primary means for cracking heavy oil has the advantages such as a strong adaptability to raw materials, flexible product schemes, high target product selectivity, excellent product quality, and high added-value, and can satisfy the requirements on clean fuel in the market and has become the main secondary refining technology in the twenty-first century.

Single-stage hydrocracking technology has the advantages of simple process, easy operation, low investment, stable product selectivity and property. In the single-stage hydrocracking technology, since the raw material is in direct contact with the single-stage hydrocracking catalyst without any pre-refining treatment or with a simple pre-refining treatment, the single-stage hydrocracking catalyst is required to have a stronger hydrogenating performance and a stronger resistance to impurities. Meanwhile, the crude oil quality becomes worse year by year, and the refinery begins to apply the crude oil vacuum deep distillation technology in order to increase the economic benefits, so that the end boiling point of the vacuum distillate is increased from 520° C. to about 600° C. Due to the increasing density, increasingly high distillation range, increasing molecular weight of the hydrocarbon molecules contained therein, increasingly complex structure, and increasing amounts of impurities such as sulfur and nitrogen, the difficulties of hydrocracking treatment are greatly increased, which presents the increasingly higher requirements on hydrocracking technology and hydrocracking catalysts, in particular higher requirements on the single-stage hydrocracking catalyst.

Without protection by hydrogenation pre-refining catalyst, the single-stage hydrocracking catalyst is in direct contact with a plurality of organosulfides and organonitrides. Thus the catalyst is required to necessarily have a very high hydrodenitrogenation activity, a very high hydrodesulfurization activity and a hydrosaturation performance, so as to maintain the sufficient exertion of the catalyst performance. The hydrogenation performance of the hydrocracking catalyst having a conventional metal amount (the total amount of the hydrogenation metal is generally lower than 30% calculated by the oxides) cannot satisfy the actual use requirements on the single-stage hydrocracking catalyst.

Hydrocracking catalysts are generally prepared by the impregnation method, the co-precipitation method and the comulling method. As stated in CN01123767.8, U.S. Pat. No. 6,527,945, CN00110016.5, CN00109747.4 and U.S. Pat. No. 5,565,088, when the impregnation method is used to load active components, the specific surface area and pore volume of the catalyst support are obviously influenced. Thus the amount of the active components is limited, and generally no more than 30 wt. %; otherwise, the specific surface area and pore volume will not satisfy the requirements on the single-stage hydrocracking catalyst. Hydrocracking catalysts having a very high active metal amount can be obtained by the co-precipitation method. As stated in U.S. Pat. No. 5,086,032, U.S. Pat. No. 4,820,677 and CN200410050730.9, the metal amount may be as high as 50%-95%. The catalyst prepared by the co-precipitation method has a smaller pore volume and specific surface area, and can only be used for treating distillates lighter than diesel oil. Moreover, since the catalyst prepared by the co-precipitation method has a low metal utilization, a bad metal dispersion capability, a complex preparation process, and a worse product stability, the catalyst has a low cost performance. The comulling method can be used for preparing the catalyst having various active metal amounts. However, the catalyst prepared by the kneading method has a relatively worse performance, a low specific surface area and a low active metal utilization, so that it has been less used.

The single-stage hydrocracking catalyst is generally required to have a higher active metal amount, and to have a higher specific surface area and a pore volume at the same time. However, the aforesaid current methods cannot simultaneously satisfy these two requirements. That is to say, the hydrocracking catalyst having a high hydrogenation active metal amount, a high pore volume and a specific surface area at the same time cannot be obtained according to the prior art.

CONTENTS OF THE INVENTION

In response to insufficient performances of the hydrocracking catalyst having a conventional metal amount, and to the limits of the processes for preparing the hydrocracking catalyst having a high metal amount, the present invention provides a single-stage hydrocracking catalyst having large pores, high specific surface area and high metal amount, which is prepared by the preparation technology of the present impregnation method.

In the first aspect of the present invention, the present invention provides a hydrocracking catalyst, comprising a cracking component and a hydrogenation component, wherein the cracking component comprises from 0 to 20 wt. % of a molecular sieve and from 20 to 60 wt. % of an amorphous silica-alumina, the hydrogenation component comprises at least one hydrogenation metal in a total amount of from 34 wt. % to 75 wt. %, preferably from 40 wt % to 60 wt %, calculated by the mass of oxides, each amount is based on the total weight of the catalyst, the hydrocracking catalyst has a specific surface area of from 150 $m^2/g$ to 350 $m^2/g$ and a pore volume of from 0.20 $cm^3/g$ to 0.50 $cm^3/g$, and the product of the percent amount M (i.e. M=34%-75%, preferably 40%-60%) of the total mass of the hydrogenation metal and the specific surface area S is equal to or more than 100, i.e. M×S≥100 $m^2/g$, preferably M×S=100-170 $m^2/g$, more preferably M×S=120-160 $m^2/g$.

In one embodiment, the hydrocracking catalyst of the present invention has an average pore diameter R of from 7 to 15 nm.

In one embodiment, the hydrocracking catalyst of the present invention may comprises suitable components as required, such as alumina, clay, an auxiliary agent and the like, wherein the auxiliary agent is generally one or more selected from the group consisting of phosphorus, fluorine, boron, titanium, zirconium and the like.

In one embodiment, the molecular sieve in the hydrocracking catalyst of the present invention is selected from the group consisting of Y-type molecular sieves, β-molecular sieves, ZSM-5 molecular sieves, SAPO molecular sieves, and MCM-41 mesoporous sieves, or combinations thereof, preferably Y-type molecular sieves or β-molecular sieves. The molecular sieve is in an amount of, preferably, from 1 wt. % to 10 wt. %. The type and amount of the molecular sieve can be specifically optimized and determined according to the raw material properties and product requirements.

In one embodiment, the amorphous silica-alumina in the hydrocracking catalyst of the present invention is the main cracking component and is the place for dispersing a plurality of hydrogenation active metals, so as to be required to have a greater pore volume and specific surface area and suitable acid properties. The specific requirements are as follows: the amorphous silica-alumina has a specific surface area of from 400 to 650 $m^2/g$, preferably from 400 to 550 $m^2/g$, a pore volume of from 1.0 to 2.0 $cm^3/g$, preferably from 1.2 to 1.6 $cm^3/g$, a silica mass amount of from 20 wt. % to 80 wt. %, preferably from 30 wt. % to 65 wt. %, an average pore diameter of from 10 to 20 nm, preferably from 10 to 15 nm, an infrared acid amount (determined by the pyridine adsorption infrared spectroscopy at 160° C.) of from 0.3 to 0.8 mmol/g.

In one embodiment, the hydrogenation component in the hydrocracking catalyst of the present invention is one or more selected from the group consisting of W, Mo, Ni and Co, preferably W and Ni.

The hydrocracking catalyst of the present invention is especially suitable for the single-stage hydrocracking process.

In the second aspect of the present invention, the hydrocracking catalyst of the present invention is prepared by the following steps:
(1) homogeneously mixing the required molecular sieve powder, amorphous silica-alumina precursor powder and optional alumina powder;
(2) formulating an impregnating solution containing the hydrogenation active metal component;
(3) impregnating the mixed powder in step (1) with the impregnating solution in step (2);
(4) filtering, drying, pulverizing, adding a suitable adhesive or peptizing agent, molding, drying and calcining to obtain a final hydrocracking catalyst.

Other required components such as the auxiliary agents may be added into the solid powder, or the impregnating solution.

In one embodiment of the process for preparing the hydrocracking catalyst, the amorphous silica-alumina precursor is the amorphous gelatineous silica-alumina dry powder and prepared by the following steps:
(1) conducting the neutralization and gelatinization reaction of an acidic aluminum salt solution (e.g. one or more selected from the group consisting of $AlCl_3$, $Al(NO_3)_3$, and $Al_2(SO_4)_3$) with a mixed solution formulated from an alkaline sodium silicate and sodium aluminate according to a ratio at a temperature ranging from 20 to 80° C. and a pH value ranging from 4.0 to 9.5;
(2) adding an organosilicon source after gelatinization, wherein the silicon source is one or more selected from organic silicon oils or silicon esters; the organosilicon is added in an amount of from 5 wt. % to 40 wt. %, preferably from 10 wt. % to 30 wt. %, relative to the total silicon amount required by the final product, adjusting the pH value and temperature so as to make the ageing temperature ranging from 60 to 80° C., the pH value ranging from 6.0 to 10.0, and the ageing time ranging from 60 to 300 min;
(3) filtering and washing the sol obtained in step (2);
(4) drying and pulverizing the filter cake obtained in step (3), to obtain an amorphous gelatineous silica-alumina dry powder.

In the process for preparing the hydrocracking catalyst of the present invention, other preparation procedures and conditions are well known by those skilled in the art.

In the third aspect of the present invention, it provides a single-stage hydrocracking process, wherein the vacuum distillate is in contact with the hydrocracking catalyst according to the first aspect of the present invention in the presence of hydrogen gas.

In one embodiment of the single-stage hydrocracking process of the present invention, the hydrocracking reaction is conducted at a temperature of from 350 to 480° C., a reaction pressure of from 8 to 20 MPa, a liquid hourly volume space velocity of the vacuum distillate of from 0.4 to 5 $h^{-1}$, and a hydrogen/oil volume ratio of from 100 to 3,000 under the standard states.

In one embodiment of the single-stage hydrocracking process of the present invention, a small amount of the hydrorefining catalyst may be used before and/or after the hydrocracking catalyst is used, wherein the hydrorefining catalyst is used in an amount of from 5% to 90%, preferably from 30% to 80% relative to the volume of the hydrocracking catalyst.

In one embodiment of the single-stage hydrocracking process of the present invention, the vacuum distillate has a final boiling point of from 500 to 630° C.

The hydrocracking catalyst obtained by using special macroporous amorphous silica-alumina as the dispersion support of the main acidic component and active component and by using a solid powder impregnation method in the present invention has a higher pore volume and specific surface area as well as a higher hydrogenation active component content. The hydrocracking catalyst of the present invention has a higher hydrogenation performance, in particular hydrodenitrogenation performance, so as to ensure the normal exertion of the cracking properties of the single-stage hydrocracking catalyst.

The hydrocracking catalyst of the present invention is prepared by a powder impregnation process. As compared with the conventional impregnation process of the molded support, the present powder impregnation process can absorb more impregnation solution, and have a solution absorption rate of more than 500%, while the conventional impregnation process of the molded support only has a solution absorption rate of 100% during the impregnation. Thus the impregnating solution does not need a higher metal concentration. The solution has a simple formulation and stable properties and can be used in the industrial scale. A more dilute metal salt impregnating solution may decrease the solution viscosity and reduce the surface tension of the solution, so as to weaken the effect of the capillary resistance during the impregnation process. The present process not only can ensure a high amount of the metal components in the catalyst, but also further increase the dispersion degree of the metal on the support surface.

Preferably, the hydrocracking catalyst of the present invention uses the modified molecular sieves and macroporous amorphous silica-alumina support, and the powder-pulping addition method is used for impregnation, which can ensure that the catalyst not only has a higher metal amount and a better uniformity of the metal component distribution, but also has a higher pore volume and surface area.

During the preparation of the hydrocracking catalyst of the present invention, the impregnating solution is recycled. Thus such process is characterized in simple preparation process, low cost and less pollution, and is suitable for the industrial scale.

In the present invention, a special Si-modified macroporous alumina having a superhigh pore volume and specific surface area can be used as the support, which may support more metal components and ensure that the metal components can be better dispersed on the support. A single macroporous alumina support can be used in the process of the present invention, which can ensure that the catalyst not only has a higher metal amount and a better uniformity of the metal component distribution, but also has a higher pore volume and surface area.

The amorphous silica-alumina used in the catalyst support of the present invention is prepared by co-precipitating silica and alumina at the same time and introducing organosilicon source as the modified pore-expanding agent after the completion of the gelatinization reaction, which can not only obtain the amorphous silica-alumina having a uniform distribution of silica and alumina, but also increase the Si:Al ratio, pore volume and specific surface area of the amorphous silica-alumina, so as to prepare the amorphous silica-alumina having macropores, high specific surface and high silica-alumina ratio satisfying the requirements on the catalyst performance. Due to the uniform distribution of alumina and silica, the acid centers of the amorphous silica-alumina can also be uniformly distributed. After the introduction of organosilicon during the preparation of the amorphous silica-alumina, the organic substances expand and volatilize during the drying and calcining processes, so as to enable the amorphous silica-alumina to obtain a greater pore volume and specific surface. Moreover, the pore volume and specific surface area of the product can be adjusted by adjusting the addition amount of organosilicon according to the actual use requirements. During the preparation of the amorphous silica-alumina, pollutants such as ammonia are not used, so that there is no discharge of ammonia nitrogen. The silicon source is the combination of low-cost water glass and a small amount of organosilicon source, so as to effectively control the preparation cost. Thus such process is characterized in simple preparation process, low cost and no pollution, and is suitable for the industrial scale. During the preparation of the amorphous silica-alumina, the silica-alumina ratio of the amorphous silica-alumina product can be flexibly controlled by adjusting the ratio of sodium silicate to sodium aluminate in the alkaline solution, and the ratio of sodium silicate to organosilicon, so as to obtain the amorphous silica-alumina having a broad silica amount ranging from 20 wt. %. to 80 wt. %. The silica amount in the amorphous silica-alumina has a direct relation with the acidity, and thus the acidity can be further adjusted to prepare the amorphous silica-alumina materials having different acidities according to different use requirements.

As used herein, the singular form "a," "an," and "the" include plural references unless the context clearly dictates otherwise.

EMBODIMENTS

One specific process for preparing the catalyst of the present invention is stated as follows.

(1) Formulation of non-noble hydrogenation metal salt solution, taking tungsten and nickel as an example: gradually adding nickel nitrate and ammonium meta-tungstate crystals into a certain amount of deionized water while stirring, resting after the crystals are completely dissolved, filtering to obtain a metal impregnating solution having a $WO_3$ amount of 10.0-50.0 g$WO_3$/100 ml, and a NiO amount of 2.0-15.0 gNiO/100 ml. The formulation processes of the molybdenum-nickel, molybdenum-cobalt and three metal component solution are the mature technology and well known in the art.

(2) Determining the powdered modified molecular sieves, optional alumina (as the support) and amorphous silica-alumina dry basis: weighing a certain amount of the components above according to the ratio, adding under stirring into the metal impregnating solution having a solid-liquid volume ratio of 1:5 to 1:20, pulping for 30-120 min, filtering the mixed slurry, controlling the filter cake dry basis to be from 15 wt. %. to 30 wt. %., drying at 100-150° C. for 2-6 h to obtain metal-containing powder having a dry basis being 40 wt %-80 wt %, pulverizing, controlling the particle size to be from 100 to 200 meshes. The required molecular sieves may be prepared according to the existing methods in the art, or may be the commercially available product; and other components such as the required auxiliary agents may be added into the solid powder, or into the impregnating solution.

(3) Rolling the powder supporting the hydrogenation metal obtained in step (2), adding dilute nitric acid having a concentration of 2-10 g $HNO_3$/100 ml after 20-60 min, continuing to roll so as to form an extrudable paste, then extruding and molding into bars having a length of 3-8 mm, wherein the catalyst may be in the form of column, clover, four-leaf clover and other heterotypic bar shapes.

(4) Drying and calcining the bar obtained in step (3): firstly drying at 100-150° C. for 2-6 h, then calcining at 400-600° C. for 3-10 h to prepare a catalyst product.

The modified molecular sieve used in the hydrocracking catalyst support of the present invention is selected from the group consisting of modified Y-type molecular sieves, β-molecular sieves, ZSM-5 molecular sieves, SAPO molecular sieves, and MCM-41 mesoporous sieves, or combinations thereof. The molecular sieves can be modified by the hydrothermal treatment or by the chemical dealuminization with EDTA, $SiCl_4$, $(NH_4)_2SiF_6$, phosgene or oxalic acid, or can be those modified by the combination of the hydrothermal treatment using acidic, alkaline or salt complexing agents with the chemical dealuminization. The modified molecular sieves have the properties of a silica-alumina molar ratio of 3-100, preferably 10-60, a $Na_2O$ amount of ≤0.5 wt %, an infrared acid amount of 0.1-1.2 mmol/g, preferably 0.2-0.6 mmol/g.

In the present invention, super-macroporous modified alumina, preferably macroporous modified alumina prepared according to CN200510047483.1, having a pore volume as high as 1.4 mL/g-1.8 mL/g and a specific surface area of 500 $m^2$/g-550 $m^2$/g, can be used as the support component.

Macroporous amorphous silica-alumina of the present invention has a pore volume as high as 1.0 mL/g-2.0 mL/g, and a specific surface area of 400 m$^2$/g-650 m$^2$/g. One specific process for preparing the same is stated as follows.

(1) Formulation of an acidic solution, taking the preparation of AlCl$_3$ solution as an example: reacting a common alumina with hydrochloric acid at 90-120° C., deferrizing with active carbon to make the Fe/Al$_2$O$_3$ value less than 0.005% by weight and to prepare fine AlCl$_3$ solution, and diluting to obtain a solution having Al$_2$O$_3$ concentration of 10-60 g/L which may be used as the treatment fluid during the gelatinization.

(2) Formulation of an alkaline solution: formulating NaAlO$_2$ solution firstly, adding sodium silicate solution while stirring to prepare a transparent mixed solution containing 5-80 g Al$_2$O$_3$/L and 5-120 g SiO$_2$/L.

(3) Gelatinization process: adding the acidic solution and alkaline solution at the same time into the gelatinization tank at a certain flow rate, stirring, controlling the gelatinization time to be from 60 to 100 min, controlling the gelatinization reaction temperature to be from 20 to 80° C., preferably from 50 to 70° C., controlling the pH during the gelatinization reaction to be from 4.0 to 9.5, adding an organosilicon solvent after the gelatinization reaction, ageing the slurry at a pH of 6.0-10.0 and a temperature of 60-80° C. for 60-300 min.

(4) Filtering and washing: filtering the aged slurry, separating the mother liquor, washing the resultant filter cake with deionized water three to five times for 20-50 min at a controlled temperature of from 60 to 80° C.

(5) Drying: drying the resultant filter cake in step (4) at 100-150° C. for 1-20 h.

The metal salt solution of the present invention is generally one or more of the salt solutions of the VIB or VIII group metals, such as W, Mo, Ni, Co and the like, wherein the metal solution generally has a concentration of 5.0-50.0 g metal/100 mL.

In the present invention, the specific surface area and pore volume are determined by the low-temperature liquid nitrogen physical adsorption method; infrared acid amount, B acid and L acid are determined by the pyridine adsorption infrared spectroscopy, wherein the sum of B acid and L acid is the infrared acid amount; the microelements are determined by the plasma emission spectroscopy.

The following examples are used for more detailedly disclosing the process for preparing the support of the present invention, but the scope of the present invention is not confined to the scopes of these examples. The percent amount involved therein is the mass percent amount.

Example 1 (Comparison Example)

578 g of macroporous alumina (produced by Tianjin Tianjiu Co., Ltd, having a pore volume of 0.82 ml/g, a specific surface area of 323 m$^2$/g and a dry basis of 71.1%), and 386 g microporous alumina (SB powder produced by SASOL Germany GmbH) were used to prepare an adhesive (having a dry basis of 26.2%). 6 g of sesbania powder was added, and milled for 30 min. A suitable amount of distillated water was added to enable the mixture to be in an extrudable paste form. The mixture was extruded into a bar form, wherein the pore plate of the bar extruder is in a clover form having a diameter of 1.5 mm. The wet bar was dried at 120° C. for 4 h, calcined at 550° C. for 3 h, and numbered HF-1S. Two parts of HF-1S support, 120 g for each part, were respectively and oversaturatedly impregnated in a tungsten-nickel solution (having a WO$_3$ amount of 43.1 g/100 ml, and a NiO amount of 7.2 g/100 ml) and a molybdenum-nickel solution (having a MoO$_3$ amount of 40.7 g/100 ml, and a NiO amount of 6.5 g/100 ml). After impregnation, the catalyst was calcined at 480° C. to prepare the catalyst products numbered HF-1A and HF-1B respectively.

Example 2 (Comparison Example)

Macroporous alumina in Example 1 was changed to silicon-modified macroporous alumina in the same amount which was prepared according to the patent application CN200510047483.1, and the others were the same as those in Example 1, to prepare the support numbered HF-25 and the catalysts numbered HF-2A and HF-2B.

Example 3 (Comparison Example)

The impregnating solutions in Example 2 were adjusted, wherein the tungsten-nickel solution had a WO$_3$ amount of 51.5 g/100 ml, and a NiO amount of 11.4 g/100 ml); and the molybdenum-nickel solution had a MoO$_3$ amount of 50.3 g/100 ml, and a NiO amount of 12.4 g/100 ml), and the others were the same as those in Example 2, to prepare the support numbered HF-35 and the catalysts numbered HF-3A and HF-3B.

Example 4 (Comparison Example)

578 g of Tianjiu macroporous alumina (produced by Tianjin Tianjiu Co., Ltd, having a pore volume of 0.82 ml/g, a specific surface area of 323 m$^2$/g and a dry basis of 71.1%, which are the same as those in Example 1) was hydrothermally treated for 40 min at a temperature of 560° C. and a vapor pressure of 0.1 MPa. Three metal impregnating solutions were prepared: the tungsten-nickel solution (having a WO$_3$ amount of 12.1 g/100 ml, and a NiO amount of 2.1 g/100 ml), the molybdenum-nickel solution (having a MoO$_3$ amount of 11.7 g/100 ml, and a NiO amount of 1.8 g/100 ml), and the tungsten-molybdenum-nickel solution (having a WO$_3$ amount of 6.3 g/100 ml, a MoO$_3$ amount of 7.7 g/100 ml, and a NiO amount of 2.6 g/100 ml). The hydrothermally treated alumina powder was added into each 800 ml stirring metal impregnating solution, impregnated for 120 min, filtered, dried at 120° C. for 4 h, pulverized, and sifted with 180 meshes. The resultant powder was mixed with a suitable amount of sesbania powder; dilute nitric acid having a concentration of 4 gHNO$_3$/100 ml was added for molding, wherein the form of the bar-extrusion pore plate was clover having a diameter of 1.5 mm. The wet bar was dried at 120° C. for 4 h, calcined at 480° C. for 3 h, and numbered HF-4A, HF-4B and HF-4C respectively.

Example 5

Macroporous alumina in Example 4 was changed to the same amount of macroporous gelatineous amorphous silica-alumina powder (having a pore volume of 1.32 ml/g, a specific surface area of 485 m$^2$/g, a dry basis of 75.4% and a silica amount of 54.4% (based on the dry basis), an average pore diameter of 12.7 nm and an infrared acid amount of 0.66 mmol/g); a suitable amount of microporous alumina adhesive was added during molding; and the others were the same as those in Example 4, to prepare the catalysts numbered HF-5A, HF-5B and HF-5C respectively.

Macroporous gelatineous amorphous silica-alumina powder was prepared by the steps of parallel-flow adding dropwise 6,000 ml of a AlCl₃ solution containing 5 g/100 mL of Al₂O₃ and a mixed solution of sodium aluminate and sodium silicate containing 5 g/100 mL of Al₂O₃ and 15 g/100 mL of SiO₂ into a stirring gelatinization reaction tank having a temperature of 65° C., maintaining the pH value to be 8.0, the reaction contact lasting 40 min until the completion of the dripping of the AlCl₃ solution, continuing to stir for 10 min, adding dropwise 120 mL of tetra ethyl orthosilicate for 20 min, adjusting the slurry pH value to 9.0 with 5% sodium hydroxide solution and ageing for 1.5 h, filtering the product, washing three times with a deionized water in a solid/liquid ratio of 1:20 at 70° C., drying the resultant filter cake at 120° C. for 3 h to obtain about 1,200 g of macroporous gelatineous amorphous silica-alumina powder.

Example 6

Macroporous amorphous silica-alumina prepared by the following process and the macroporous alumina in Example 4 were used in a mass ratio of 4:1 (the total amount thereof being 578 g). The concentrations of the impregnating solutions were adjusted as follows: the tungsten-nickel solution was adjusted to have a WO₃ amount of 18.0 g/100 ml and a NiO amount of 2.8 g/100 ml, the molybdenum-nickel solution was adjusted to have a MoO₃ amount of 17.8 g/100 ml and a NiO amount of 2.9 g/100 ml, and the tungsten-molybdenum-nickel solution was adjusted to have a WO₃ amount of 8.7 g/100 ml, a MoO₃ amount of 9.9 g/100 ml, and a NiO amount of 3.5 g/100 ml. The others were the same as those in Example 5. The catalysts numbered HF-6A, HF-6B and HF-6C were prepared respectively.

Macroporous amorphous silica-alumina (having the properties of a pore volume of 1.40 ml/g, a specific surface area of 550 m²/g, a dry basis of 74.3% and a silica amount of 40.5% (based on the dry basis), an average pore diameter of 13.6 nm and an infrared acid amount of 0.61 mmol/g) was prepared by the steps comprising parallel-flow adding dropwise 16,000 ml of a AlCl₃ solution containing 5 g/100 mL of Al₂O₃ and a mixed solution of sodium aluminate and sodium silicate containing 5 g/100 mL of Al₂O₃ and 15 g/100 mL of SiO₂ into a stirring gelatinization reaction tank having a temperature of 65° C., maintaining the pH value to be 8.0, the reaction contact lasting 40 min until the completion of the dripping of the AlCl₃ solution, continuing to stir for 10 min, adding dropwise 2,800 mL of organic silicon oil containing 10 g/100 mL of SiO₂ (having a brand No. 5001, produced by Shangyu City Fine Chemical Plant, Zhejiang, China) for 40 min, adjusting the slurry pH value to 9.0 with 5% sodium hydroxide solution and ageing for 1.5 h, filtering the product, washing three times with a deionized water having a solid/liquid ratio of 1:20 at 70° C., drying the resultant filter cake at 120° C. for 3 h to obtain about 2,400 g of macroporous gelatineous amorphous silica-alumina powder.

Meanwhile, to the combination of macroporous amorphous silica-alumina and macroporous alumina in the same amounts stated in this Example was added an adhesive, molded, dried at 120° C. for 4 h, calcined at 550° C. for 3 h to obtain a catalyst support numbered HF-3S. Three parts of the HF-3S support were prepared and impregnated two times with the impregnating solutions of HF-6A, HF-6B and HF-6C, wherein the impregnating solutions were the tungsten-nickel solution, the molybdenum-nickel solution and the tungsten-molybdenum-nickel solution as stated in this Example; the impregnation method consisted of the first impregnation step, the first drying step at 120° C. for 5 h after the first impregnation, the second impregnation step, the second drying step under the same conditions to the first drying step, and a calcination step at 480° C. for 2 h. The catalysts numbered HF-6A-1, HF-6B-2 and HF-6C-3 were prepared (HF-6A-1, HF-6B-2 and HF-6C-3 are the comparison examples of the present invention)

Example 7

The concentrations of the impregnating solutions in Example 5 were adjusted as follows: the tungsten-nickel solution was adjusted to have a WO₃ amount of 20.8 g/100 ml and a NiO amount of 3.4 g/100 ml, the molybdenum-nickel solution was adjusted to have a MoO₃ amount of 21.3 g/100 ml and a NiO amount of 4.1 g/100 ml, and the tungsten-molybdenum-nickel solution was adjusted to have a WO₃ amount of 8.4 g/100 ml, a MoO₃ amount of 12.1 g/100 ml, and a NiO amount of 4.3 g/100 ml. Meanwhile, a modified Y molecular sieve (having a silica-alumina molar ratio of 13, an Na₂O amount of equal to or less than 0.1 wt. %, and an infrared acid amount of 0.8 mmol/g) in an amount of 5% by weight of the final catalyst mass was used. The others were the same as those in Example 5. The catalysts numbered HF-7A, HF-7B and HF-7C were prepared respectively.

Example 8

The concentrations of the impregnating solutions in Example 5 were adjusted as follows: the tungsten-nickel solution was adjusted to have a WO₃ amount of 24.3 g/100 ml, and a NiO amount of 4.0 g/100 ml, the molybdenum-nickel solution was adjusted to have a MoO₃ amount of 25.3 g/100 ml and a NiO amount of 5.4 g/100 ml, and the tungsten-molybdenum-nickel solution was adjusted to have a WO₃ amount of 8.9 g/100 ml, a MoO₃ amount of 15.4 g/100 ml, and a NiO amount of 4.9 g/100 ml. The others were the same as those in Example 5. The catalysts numbered HF-8A, HF-8B and HF-8C were prepared respectively.

In this Example, the physical and chemical analyses and activity evaluation of the catalysts in each example were conducted, and the physical and chemical properties of the catalysts in each example were listed in Table 1.

TABLE 1

| | Physicochemical properties of the catalysts | | | | | | | | |
|---|---|---|---|---|---|---|---|---|---|
| No. | HF-1A | HF-2A | HF-3A | HF-4A | HF-5A | HF-6A | HF-6A-1 | HF-7A | HF-8A |
| WO₃, % | 23.2 | 27.9 | 34.1 | 26.6 | 27.1 | 41.6 | 41.2 | 48.2 | 56.2 |
| NiO, % | 5.5 | 6.4 | 10.1 | 6.8 | 7.5 | 9.9 | 10.5 | 12.1 | 14.2 |
| Total metal amount M, % | 28.7 | 34.3 | 44.2 | 33.4 | 34.6 | 51.5 | 51.7 | 60.3 | 70.4 |
| S, m²/g | 188 | 264 | 200 | 210 | 321 | 261 | 156 | 180 | 153 |

TABLE 1-continued

Physicochemical properties of the catalysts

| | | | | | | | | | |
|---|---|---|---|---|---|---|---|---|---|
| V, ml/g | 0.330 | 0.401 | 0.347 | 0.340 | 0.454 | 0.421 | 0.284 | 0.340 | 0.291 |
| R, nm | 7.8 | 9.1 | 8.0 | 8.1 | 11.3 | 9.7 | 7.3 | 7.9 | 7.3 |
| M × S | 54 | 91 | 88 | 70 | 111 | 134 | 81 | 109 | 108 |

| No. | HF-1B | HF-2B | HF-3B | HF-4B | HF-5B | HF-6B | HF-6B-1 | HF-7B | HF-8B |
|---|---|---|---|---|---|---|---|---|---|
| $MoO_3$, % | 22.9 | 28.2 | 35.1 | 25.7 | 28.4 | 42.6 | 42.5 | 46.9 | 54.6 |
| NiO, % | 4.9 | 6.3 | 9.8 | 6.5 | 7.7 | 11.1 | 11.3 | 10.1 | 16.4 |
| Total metal amount M, % | 27.8 | 34.5 | 44.9 | 32.2 | 36.1 | 53.7 | 53.8 | 57.0 | 71.0 |
| S, $m^2/g$ | 197 | 277 | 187 | 234 | 350 | 278 | 168 | 213 | 164 |
| V, ml/g | 0.354 | 0.399 | 0.326 | 0.421 | 0.471 | 0.415 | 0.276 | 0.364 | 0.312 |
| R, nm | 8.0 | 9.4 | 7.2 | 9.8 | 12.1 | 10.6 | 6.7 | 8.4 | 8.0 |
| M × S | 55 | 96 | 84 | 75 | 126 | 149 | 90 | 121 | 116 |

| No. | HF-4C | HF-5C | HF-6C | HF-6C-1 | HF-7C | HF-8C |
|---|---|---|---|---|---|---|
| $WO_3$, % | 13.4 | 14.6 | 18.5 | 18.2 | 16.7 | 20.6 |
| $MoO_3$, % | 14.7 | 16.4 | 22.4 | 23.1 | 26.1 | 30.1 |
| NiO, % | 5.8 | 6.9 | 10.9 | 10.4 | 9.7 | 13.4 |
| Total metal amount M, % | 33.9 | 37.9 | 51.8 | 51.7 | 52.5 | 64.1 |
| S, $m^2/g$ | 211 | 341 | 286 | 149 | 231 | 200 |
| V, ml/g | 0.366 | 0.424 | 0.397 | 0.247 | 0.350 | 0.332 |
| R, nm | 8.4 | 11.0 | 10.1 | 6.6 | 9.0 | 7.9 |
| M × S | 72 | 129 | 148 | 77 | 121 | 128 |

R represents the average pore diameter.

The evaluation apparatus was a 200 ml small-scale hydrogenation unit, and the catalyst was presulphurized before the activity evaluation. The properties of the raw materials and the technological conditions used for evaluating the catalyst activity were listed in Tables 2 and 3, and the comparison results of relative hydrodenitrogenation activity of the catalysts were listed in Table 4.

TABLE 2

Main properties of the feedstock

| | |
|---|---|
| Density, (20° C.)/g · $cm^{-3}$ | 0.9164 |
| Boiling range/° C. | |
| IBP/10% | 328/376 |
| 30%/50% | 400/430 |
| 70%/90% | 455/499 |
| 95%/FBP | 514/531 |

TABLE 2-continued

Main properties of the feedstock

| | |
|---|---|
| Condensation point/° C. | 34 |
| Refraction/$n_D^{70}$ | 1.4899 |
| Carbon residue, mass % | 0.32 |
| S, mass % | 1.60 |
| N, mass % | 0.1475 |

TABLE 3

Operating conditions of the pilot plant tests

| | |
|---|---|
| Reaction hydrogen partial pressure, MPa | 14.7 |
| Liquid hourly volume space velocity, $h^{-1}$ | 1.0 |
| hydrogen/oil volume ratio | 1000:1 |
| Average reaction temperature, ° C. | 385 |

TABLE 4

Comparison results of relative hydrodenitrogenation activity of the catalysts

| Catalysts | HF-1A | HF-1B | HF-2A | HF-3A | HF-4A | HF-4B | HF-4C | HF-5A | HF-5B | HF-5C |
|---|---|---|---|---|---|---|---|---|---|---|
| Relative hydrodenitrogenation activity, % | 100 | 103 | 95 | 94 | 105 | 107 | 102 | 114 | 122 | 118 |

| Catalysts | HF-6A | HF-6B | HF-6C | HF-6A-1 | HF-6B-2 | HF-6C-1 | HF-7C | HF-8A |
|---|---|---|---|---|---|---|---|---|
| Relative hydrodenitrogenation activity, % | 116 | 126 | 123 | 93 | 98 | 96 | 127 | 124 |

TABLE 5

Hydrocracking test results

| Catalysts | HF-6A-1 | HF-6B-1 | HF-6C-1 | HF-6A | HF-6B | HF-6C | HF-7A | FC-30 (produced by Sinopec Group) |
|---|---|---|---|---|---|---|---|---|
| Average reaction temperature, ° C.* | 397 | 395 | 395 | 387 | 385 | 386 | 385 | 391 |
| Once-through conversion rate, mass %** | 60 | 60 | 60 | 60 | 60 | 60 | 60 | 60 |
| Selectivity of middle-distillate yield, mass %** | 78 | 79 | 79 | 86 | 86 | 87 | 87 | 84 |
| BMCI of tail oil | 17 | 16 | 16 | 11 | 11 | 10 | 10 | 13 |

*Other conditions were the same as those in Table 3, and the evaluation apparatus was 200 ml small-scale hydrogenation unit.
**Once-through conversion rate was the mass percentage of the product having a temperature of less than 370° C. relative to the feedstock; and the selectivity of middle oil was the mass percentage of the product having a temperature of less than 370° C. relative to the reaction product (aviation kerosene + diesel oil).

The invention claimed is:

1. A process for preparing a hydrocracking catalyst, comprising:
   (1) conducting a neutralization and gelatinization reaction of an acidic aluminum salt solution with a mixed solution of alkaline sodium silicate and sodium aluminate at a temperature ranging from 20° C. to 80° C. and a pH value ranging from 4.0 to 9.5;
   (2) adding at least one organosilicon source after gelatinization, wherein the at least one organosilicon source is chosen from organic silicon oils or silicon esters, the at least one organosilicon is added in an amount ranging from 5% to 40% relative to the total silicon amount present in an amorphous gelatinous silica-alumina dry powder, ageing at a temperature ranging from 60° C. to 80° C., a pH value ranging from 6.0 to 10.0, for an ageing time ranging from 60 minutes to 300 minutes to obtain a sol;
   (3) filtering and washing the sol obtained in step (2); and
   (4) drying and pulverizing a filter cake obtained in step (3) to obtain the amorphous gelatinous silica-alumina powder;
   (5) optionally mixing the amorphous gelatinous silica-alumina with a molecular sieve, or an alumina, or both the molecular sieve and the alumina to form a first mixture;
   (6) formulating an impregnating solution comprising at least one hydrogenation metal;
   (7) impregnating the first mixture from step (5) or the amorphous gelatinous silica-alumina powder from step (4) with the impregnating solution from step (6); and
   (8) filtering, drying, pulverizing, adding an adhesive or a peptizing agent, molding, drying, and calcining to obtain the hydrocracking catalyst.

2. The process according to claim 1, wherein the hydrocracking catalyst comprises 0% to 20% by weight of the molecular sieve, 20% to 60% by weight of the amorphous silica-alumina, 34% to 75% by weight of the at least one hydrogenation metal (calculated based on the weight of metal oxides), and all the weight percentages are relative to a total weight of the hydrocracking catalyst.

3. The process according to claim 2, wherein the hydrocracking catalyst has a specific surface area ranging from 150 m²/g to 350 m²/g, a pore volume ranging from 0.20 cm³/g to 0.50 cm³/g, and a product (M×S) of the weight percentage of the at least one hydrogenation metal (M) and the specific surface area (S) is equal to or higher than 100 m²/g.

4. The process according to claim 1, wherein the at least one hydrogenation metal is chosen from W, Mo, Ni or Co.

5. The process according to claim 3, wherein the M×S ranges from 100 to 170 m²/g.

6. The process according to claim 3, wherein the M×S ranges from 120 to 160 m²/g.

7. The process according to claim 3, wherein the weight percentage of the at least one hydrogenation metal is ranges from 40% to 60%.

8. The process according to claim 3, wherein the specific surface area of the hydrocracking catalyst ranges from 160 m²/g to 300 m²/g, and the pore volume of the hydrocracking catalyst ranges from 0.30 cm³/g to 0.45 cm³/g.

9. The process according to claim 3, wherein the hydrocracking catalyst further comprises alumina, clay, and/or at least one auxiliary agent chosen from phosphorous, fluorine, boron, titanium, or zirconium.

10. The process according to claim 1, wherein the optional molecular sieve is chosen from Y-type molecular sieves, β molecular sieves, ZSM-5 molecular sieves, SAPO molecular sieves, or MCM-41 mesoporous molecular sieves.

11. The process according to claim 3, wherein the amorphous silica-alumina has a specific surface area ranging from 400 m²/g to 650 m²/g, a pore volume ranging from 1.0 cm³/g to 2.0 cm³/g, a silica amount ranging from 20% to 80% by weight relative to the total weight of the amorphous silica-alumina, an average pore diameter ranging from 10 nm to 20 nm, and an infrared acid amount ranging from 0.3 mmol/g to 0.8 mmol/g.

12. The process according to claim 3, wherein the amorphous silica-alumina has a specific surface area ranging from 400 to 550 m²/g, a pore volume ranging from 1.2 cm³/g to 1.6 cm³/g, a silica amount ranging from 30% to 65% by weight relative to the total weight of the at least one amorphous silica-alumina, and an average pore diameter ranging from 10 to 15 nm.

13. The process according to claim 1, wherein the at least one hydrogenation metal is W or Mo.

14. The process according to claim 1, where in the at least one hydrogenation metal is W or Ni.

15. A single-stage hydrocracking process, comprising contacting a vacuum gas oil is with a catalyst contains the hydrocracking catalyst produced according to the process of claim 1 in the presence of hydrogen gas.

16. The single-stage hydrocracking process according to claim 15, wherein the hydrocracking reaction is conducted at a temperature ranging from 350° C. to 480° C., a pressure ranging from 8 MPa to 20 MPa, a liquid hourly volume space velocity of the vacuum gas oil ranging from $0.4\ h^{-1}$ to $5\ h^{-1}$, and a volume ratio of hydrogen gas to the vacuum gas oil under the standard condition ranging from 100:1 to 3,000:1.

17. The single-stage hydrocracking process according to claim 15, wherein the catalyst further comprises a hydrorefining catalyst in an amount ranging from 5% to 90% by volume relative to the volume of the hydrocracking catalyst disposed upstream or downstream from the hydrocracking catalyst.

18. The single-stage hydrocracking process according to claim 17, wherein the hydrorefining catalyst is in an amount ranging from 30% to 80% by volume relative to the volume of the hydrocracking catalyst.

19. The single-stage hydrocracking process according to claim 15, wherein the vacuum gas oil has a final boiling point temperature ranging from 500° C. to 630° C.

\* \* \* \* \*